US007186673B2

(12) United States Patent
Varadaraj et al.

(10) Patent No.: US 7,186,673 B2
(45) Date of Patent: Mar. 6, 2007

(54) STABILITY ENHANCED WATER-IN-OIL EMULSION AND METHOD FOR USING SAME

(75) Inventors: Ramesh Varadaraj, Flemington, NJ (US); James R. Bragg, Houston, TX (US); Dennis G. Peiffer, Annandale, NJ (US); Chester W. Elspass, Alpha, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 40 days.

(21) Appl. No.: 09/819,332

(22) Filed: Mar. 28, 2001

(65) Prior Publication Data

US 2004/0122111 A1   Jun. 24, 2004

Related U.S. Application Data

(60) Provisional application No. 60/199,458, filed on Apr. 25, 2000, provisional application No. 60/199,546, filed on Apr. 25, 2000, provisional application No. 60/199,643, filed on Apr. 25, 2000.

(51) Int. Cl.
*E21B 43/22* (2006.01)

(52) U.S. Cl. .................. 507/200; 507/203; 166/305.1; 166/311

(58) Field of Classification Search ............... 507/225, 507/922, 261; 166/255, 275, 308
See application file for complete search history.

(56) References Cited

U.S. PATENT DOCUMENTS

| 2,241,273 | A | 5/1941 | Robinson et al. ........... 507/102 |
| 2,300,590 | A | 11/1942 | O'Brian ...................... 507/102 |
| 2,996,450 | A | 8/1961 | Zech et al. .................. 507/102 |
| 3,108,441 | A | 10/1963 | Watson .......................... 61/36 |
| 3,149,669 | A | 9/1964 | Binder, Jr. et al. .......... 166/400 |
| 3,208,515 | A | 9/1965 | Meadors ..................... 166/268 |
| 3,330,348 | A | 7/1967 | Hardy et al. ................ 166/268 |
| 3,356,138 | A | 12/1967 | Davis, Jr. et al. ........... 507/202 |
| 3,380,531 | A | 4/1968 | McAuliffe et al. ............ 166/45 |
| 3,386,514 | A | 6/1968 | Weber ......................... 166/42 |
| 3,412,792 | A | 11/1968 | Parker et al. .................. 166/9 |
| 3,443,640 | A | 5/1969 | Klein ............................ 166/9 |
| 3,472,319 | A | 10/1969 | McAuliffe .................. 166/294 |
| 3,490,471 | A | 1/1970 | Carlin ......................... 137/13 |
| 3,509,951 | A | 5/1970 | Enochs ........................ 175/70 |
| 3,630,953 | A | 12/1971 | Simon et al. ................ 252/312 |
| 3,707,459 | A | 12/1972 | Mason et al. ................. 208/76 |
| 3,721,295 | A | 3/1973 | Bott ........................... 166/294 |
| 3,749,171 | A | 7/1973 | Marx .......................... 166/274 |
| 3,796,266 | A | 3/1974 | Carlin et al. ............. 166/305 R |
| 3,804,760 | A | 4/1974 | Darley .................... 252/8.55 R |
| 3,818,989 | A | 6/1974 | Christopher, Jr. et al. ......... 166/275 X |
| 3,866,680 | A | 2/1975 | Dauben ...................... 166/273 |
| 3,915,920 | A | 10/1975 | Slovinsky et al. .. 260/29.6 RW |
| 3,929,190 | A | 12/1975 | Chang et al. ............... 166/274 |
| 3,965,986 | A | 6/1976 | Christopher ................ 166/292 |
| 3,980,136 | A | 9/1976 | Plummer et al. ............ 507/202 |
| 3,996,180 | A | 12/1976 | Kane ..................... 260/29.6 H |
| 4,011,908 | A * | 3/1977 | Holm ...................... 166/270.1 |
| 4,012,329 | A | 3/1977 | Hayes et al. .................. 516/22 |
| 4,034,809 | A | 7/1977 | Phillips et al. .............. 166/270 |
| 4,083,403 | A | 4/1978 | Carlin et al. ................ 166/252 |
| 4,085,799 | A | 4/1978 | Bousaid et al. ............. 166/272 |
| 4,096,914 | A | 6/1978 | McLaughlin et al. ....... 166/307 |
| 4,100,966 | A | 7/1978 | Bousaid ...................... 166/273 |
| 4,163,476 | A * | 8/1979 | Tate ........................... 166/271 |
| 4,192,753 | A | 3/1980 | Pye et al. ................. 252/8.5 A |
| 4,200,151 | A * | 4/1980 | Tate ........................... 166/271 |
| 4,216,828 | A | 8/1980 | Blair .......................... 166/274 |
| 4,219,082 | A | 8/1980 | Kalfoglou ................... 166/273 |
| 4,233,165 | A | 11/1980 | Salathiel et al. ......... 507/937 X |
| 4,248,304 | A * | 2/1981 | Phillips ...................... 166/300 |
| 4,274,956 | A | 6/1981 | Stewart ...................... 210/638 |
| 4,276,935 | A | 7/1981 | Hessert et al. .......... 166/294 X |
| 4,282,928 | A * | 8/1981 | McDonald et al. ......... 166/268 |
| 4,298,455 | A | 11/1981 | Huang ......................... 208/48 |
| 4,359,391 | A | 11/1982 | Salathiel et al. ............ 507/277 |
| 4,384,997 | A | 5/1983 | Detroit ....................... 260/124 |
| 4,391,925 | A | 7/1983 | Mintz et al. ................ 523/130 |
| 4,411,770 | A | 10/1983 | Chen et al. ................. 208/111 |
| 4,475,594 | A | 10/1984 | Drake et al. ................ 166/294 |
| 4,488,602 | A | 12/1984 | Lepper ....................... 166/274 |
| 4,505,828 | A | 3/1985 | Lipowski et al. ........... 166/267 |

(Continued)

FOREIGN PATENT DOCUMENTS

CA          849884          8/1970

(Continued)

OTHER PUBLICATIONS

International Preliminary Examination Report mailed Feb. 6, 2003 for International Patent Application No. PCT/US01/11185, filed Nov. 8, 2001, 4 pages.

(Continued)

*Primary Examiner*—Gregory Webb
(74) *Attorney, Agent, or Firm*—ExxonMobil Upstream Research Co. Law Department

(57) ABSTRACT

A method for enhancing the stability of a water-in-oil emulsion pretreating at least a portion of the oil prior to emulsification. The pretreatment step may consist of adding polymers to the oil, biotreating the oil, photochemically treating the oil, or combinations thereof. The emulsion may be used in various enhanced oil recovery methods including using the emulsion as a flooding agent to displace hydrocarbons in a subterranean formation, and using the emulsion as a barrier fluid for diverting flow of fluids in the formation.

42 Claims, No Drawings

U.S. PATENT DOCUMENTS

| | | | |
|---|---|---|---|
| 4,525,285 A | 6/1985 | Son et al. | 252/8.5 M |
| 4,592,830 A | 6/1986 | Howell et al. | 208/94 |
| 4,659,453 A | 4/1987 | Kukes et al. | 208/108 |
| 4,705,110 A | 11/1987 | Balzer | 166/274 |
| 4,706,749 A | 11/1987 | Hayes et al. | 166/267 |
| 4,732,213 A | 3/1988 | Bennett et al. | 166/292 |
| 4,741,401 A | 5/1988 | Walles et al. | 166/300 |
| 4,780,243 A | 10/1988 | Edgley et al. | 507/202 |
| 4,790,382 A | 12/1988 | Morrow et al. | 166/274 |
| 4,856,588 A | 8/1989 | Borchardt | 166/273 |
| 4,888,108 A | 12/1989 | Farnand | 208/424 |
| 4,966,235 A | 10/1990 | Gregoli et al. | 166/267 |
| 5,031,698 A | 7/1991 | Borchardt et al. | 166/272 |
| 5,080,809 A | 1/1992 | Stahl et al. | 252/8.554 |
| 5,083,613 A | 1/1992 | Gregoli et al. | 166/275 |
| 5,095,986 A | 3/1992 | Naae et al. | 166/274 |
| 5,294,353 A | 3/1994 | Dill | 166/275 |
| 5,302,293 A | 4/1994 | Kaplan et al. | 201/701 |
| 5,350,014 A | 9/1994 | McKay | 166/263 |
| 5,360,558 A | 11/1994 | Pakulski et al. | 507/202 |
| 5,373,901 A | 12/1994 | Norman et al. | 166/300 |
| 5,424,285 A | 6/1995 | Stacy et al. | 507/202 |
| 5,490,940 A | 2/1996 | Bragg et al. | 210/671 |
| 5,499,677 A | 3/1996 | Cowan | 166/293 |
| 5,603,863 A | 2/1997 | Dahms | 516/22 |
| 5,627,143 A * | 5/1997 | Sawdon | 507/103 |
| 5,780,395 A | 7/1998 | Sydansk | 507/202 |
| 5,820,750 A | 10/1998 | Blum et al. | 208/263 |
| 5,834,406 A | 11/1998 | Sydansk | 507/202 |
| 5,836,390 A | 11/1998 | Apps et al. | 166/281 |
| 5,855,243 A | 1/1999 | Bragg | 166/275 |
| 5,910,467 A | 6/1999 | Bragg | 507/202 |
| 5,927,404 A | 7/1999 | Bragg | 166/275 |
| 5,942,469 A | 8/1999 | Juprasert et al. | 507/202 |
| 5,948,242 A | 9/1999 | Ohsol et al. | 208/181 |
| 5,964,906 A | 10/1999 | Layrisse et al. | 44/302 |
| 5,985,177 A | 11/1999 | Yoshida et al. | 252/309 |
| 6,022,471 A | 2/2000 | Wachter et al. | 208/120 |
| 6,035,933 A | 3/2000 | Khalil et al. | 166/263 |
| 6,059,036 A | 5/2000 | Chatterji et al. | 166/294 |
| 6,068,054 A | 5/2000 | Bragg | 166/270 |
| 6,069,178 A | 5/2000 | Layrisse et al. | 516/50 |
| 6,105,672 A | 8/2000 | Deruyter et al. | 166/270.1 |
| 6,162,766 A | 12/2000 | Muir et al. | 507/267 |
| 6,225,262 B1 | 5/2001 | Irwin et al. | 507/203 |
| 6,227,296 B1 | 5/2001 | Reppert et al. | 166/305.1 |
| 6,291,406 B1 | 9/2001 | Rose et al. | 507/239 |
| 6,302,209 B1 | 10/2001 | Thompson, Sr. et al. | 166/305.1 |
| 6,325,147 B1 | 12/2001 | Doerler et al. | 166/252.1 |
| 6,410,488 B1 | 6/2002 | Fefer et al. | 507/103 |
| 6,524,468 B2 | 2/2003 | Varadaraj et al. | 208/5 |
| 6,544,411 B2 | 4/2003 | Varadaraj | 208/265 |
| 6,569,815 B2 | 5/2003 | Varadaraj | 507/269 |
| 6,632,778 B1 | 10/2003 | Ayoub et al. | 507/202 |
| 6,716,282 B2 | 4/2004 | Griffith et al. | 106/705 |
| 6,734,144 B2 * | 5/2004 | Varadaraj et al. | 507/103 |
| 6,800,193 B2 | 10/2004 | Varadaraj | 208/106 |
| 7,033,975 B2 | 4/2006 | Baran, Jr. et al. | |
| 2003/0139299 A1 | 7/2003 | Bragg et al. | 507/200 |
| 2003/0220204 A1 | 11/2003 | Baran, Jr. et al. | 507/200 |
| 2004/0014821 A1 | 1/2004 | Varadaraj | 516/53 |

FOREIGN PATENT DOCUMENTS

| | | |
|---|---|---|
| CA | 2044473 | 12/1992 |
| EP | 0 175 511 B1 | 1/1968 |
| EP | 0 130 632 A2 | 1/1985 |
| RU | 2057914 C1 | 4/1996 |
| SU | 1682539 A1 | 11/1989 |
| SU | 1796013 A3 | 2/1993 |
| WO | WO 95/15812 | 6/1995 |
| WO | WO 95/23909 | 9/1995 |
| WO | WO 98/53181 | 11/1998 |
| WO | WO 01/81502 A2 | 11/2001 |
| WO | WO 01/81502 A3 | 11/2001 |
| WO | WO 01/81718 | 11/2001 |
| WO | WO 03/057793 | 7/2003 |
| WO | WO 03/100214 A1 | 12/2003 |

OTHER PUBLICATIONS

U.S Appl. No. 10/319,752, filed Dec. 13, 2002, Bragg.

U.S. Appl. No. 10/422,388, filed Apr. 23, 2003, Varadaraj.

Bragg, J. R. et al., "Recent Applications of the Single Well Tracer Method for Measuring Residual Oil Saturation," SPE of AIME, Mid-Continent Section, Improved Oil Recovery Symposium Preprint, No. SPE-5805, pp. 103-113 (1976).

Bragg, J. R. et al., "Loudon Surfactant Flood Pilot-Overview Update," 3rd SPE of AIME Middle East Oil Show Conf. (Baharain, 3/14-17/83) Proc., pp. 525-536 (1983) (SPE115050).

Bragg, J. R. et al., "Measuring Well Injection Profiles of Polymer-Containing Fluids, " 3rd Joint SPE/DOE Enhanced Oil Recovery Symposium (Tulsa, 4/4-/782) Proc., pp. 953-962 (1982) (SPE/DOE 10690).

Bragg, J. R. et al., "Loudon Surfactant Flood Pilot Test," 3rd Joint SPE/DOE Enhanced Oil Recovery Symposium (Tulsa, 4/4-7/82) Proc., pp. 933-952 (1982) (SPE/DOE 10862).

Bragg, J. R., "In Situ Measurement of Residual Oil Saturation," 23rd Annual Southwestern Petroleum Short Course Assoc. Mtg., Proc. pp. 183-189 (1976).

Bragg, J. R. et al., "Control of Xanthan-Degrading Organisms in the Loudon Pilot: Approah, Methodology, and Results," 58th Annual SPE of AIME Tech. Conf. (San Francisco 10/5-8/83) Preprint No. SPE 11989, 12 pages (1983).

Broz, J.S. et al., "Blocking Of High Permeability Zones In Steamflooding By Emulsions", *Third International Conference on Heavy Crude and Tar Sands*, (Jul. 22-31, 1985) vol. 1, 443-451.

Chen, Techlen et al., "Laboratory And Field Evidence Of Emulsion Flow In Porous Media", *CIM/AOSTRA 1991 Technical Conference* (April 21-24, 1991) Paper No. CIM/AOSTRA 91-78, pp. 78-1 to 78-14.

Chung, Keng H. and Butler, Roger M. "In-Situ Emulsification By The Condensation Of Steam In Contact With Bitumen", *39th Annual Technical Meeting oof the Petroleum Society of CIM* (Jun. 12-16, 1988) Paper No. 88-39-18 pp. 18-1 to 18-17.

Civan, F. et al., "Characterization of Corrosion-Inhibiting Emulsions for Continuous Well Treatment,"SPE International Oilfield Symposium, Houston, Texas, Feb. 16-19, 1999, SPE 50719, pp. 191-206, (1999).

Civan, F. and Weers, Jerry J., "Laboratory and Theoretical Evaluation of Corrosion-Inhibiting Emulsions, "SPE Production & Facilities vol. 16 (4), pp. 260-266 (2001) (SPE 74271).

Abstract Of: Czarnecki, J. et al., "Emulsion Studies Associated with Bitumen Recovery from Canadian Oil Sands: Part I," AICHE Spring Nat. Mtg. (Mar. 10-14, 2002) (ABSTRACT ONLY).

Des Brisay et al., "Pumping Heavy Oils With The Aid of Downhole Oil-In-Water Emulsification," 38Annual CIM Petroleum Soc. Tech. Mtg. (Calgary, Canada, 6/7-10/87), preprints V. 1, pp.297-309 (1987)(Paper No. 87-38-16).

De Vries, Arnold S. and Wit, Krijn, Rheology of Gas/Water Foam in the Quality Range Relevant to Staem Foam, SPE 18075 (May 1990). (Original SPE manuscript received for review Oct. 2, 1988. Paper accepted for publication Jun. 23, 1989. Revised manuscript recieved Aug. 30, 1989. Paper (SPE 18705) first presented at the 1988 SPE Annual Technical Conference and Exhibition held in Houston, Oct. 2-5.)

Dieken, F.P et al., "Methods Manual For Chemical Analysis Of Water And Wastes", Alberta Research Council (Updated Oct. 1, 1996) pp. 1-4.

Dotson, C., Huff and R., Haskins, S. R., "Report on the Start-up of a Unique Hydrocyclone-Based System for Treating Produced Water", *Produced Water 2*, Plenum Press, pp. 431-445, (1996).

Farrell, James and Marsden, Jr., S. S., "Foam and Emulsion Effects on Gas Driven Oil Recovery," SUPRI-TR-62, DOE/BC/14126-3, Performed Under Contract No. FG19-87BC14126 and AC03-81SF11564 (Nov. 1988).

Felian, B. et al., "Investigation of Crude Oil-Water Emulsions in Presence of Non-Ionic Surfactants, I. Behavior of Emulsions at Room Temperature and in Ion-Free systems", Acta Physica et Chemica, v 29 (3-4), pp. 223-232, (1983).

Felian, B. et al., "Investigation of Crude Oil-Water Emulsions in Presence of Non-Ionic Surfactants, II. Behavior of Emulsions at Elevated Temperatures, and Emulsification of Crude Oil Fractions", Acta Physica et Chemica, v 30 (3*4), pp. 183-192, (1984).

Fiori, Marco and Farouq Ali, S.M. "Optimal Emulsion Design For The Recovery Of A Saskatchewan Crude", *40th Annual Technical Meeting of the Petroleum Society of CIM* (May 28-31, 1989) Paper No. 89-40-43, pp. 43-1 to 43-28.

Fraim, M.L. et al., "Laboratory Testing and Simulation Results for High Pressure Air Injection in a Waterflooded North Sea Oil Reservoir," SPE 38905, SPE Annual Technical Conference & Exhibition, San Antonio, U.S.A. (Oct. 5-8, 1997).

French, T. R. et al., "Use of Emulsion for Mobility Control During Steamflooding, " 56th Annu SPE Calif Reg Mtg (Oakland, Calif, 4/2-4/86) Proc V. 1 pp. 43-54 (1986) (SPE-15052).

Friesen, W.I. and Levine, S. "Electrostatic Interaction between Two Water-in-Oil Emulsion Droplets on an Electric Field", Journal of Colloid and Interface Science, vol. 150 No. 2 (May 1992) pp. 517-527.

"Fundamental Processes," CPGE Fundamental Processes Staff Other CPGE Research, http://www.cpge.utexas.edu/fp, pp. 1-3, printout dated Jul. 17, 2003.

Garthoffner, E. H., "The Role of Oil-in-Water Emulsions in Thermal Oil Recovery Processes", SPE OF AIME California Regular Meeting, SPE 7952, 8 pp, (Apr.1979).

Gotbunov, A. T. et al., "In Situ Emulsification During Thermal Alkali Flooding", Neft Khoz No. 7, pp. 42-45, (Jul. 1984).

ABSTRACT OF: Gotbunov, A. T. et al., "In Situ Emulsification During Thermal Alkali Flooding", Neft Khoz No. 7, pp. 42-45, (Jul.1984).

Hall, B. E. and Lasater, R. M., "Surfactants for Well Stimulation", 159th Natl. American Chemical Society Meeting, (Feb. 1970).

Heathman, James et al., "New Test Procedures Optimize Surfactant Blends", Oil & Gas Journal v. 97 (40), pp. 71-74, (1999).

Humenick, Michael J. et al., "High Rate Filtration of Soilds-Stabilized Oil-In-Water Emulsions," Technical report CR WR-105, EHE-73-06, University of Texas, Austin (Dec. 1973).

Henery, Deborah and Fuhr, Bryan, "Preparation of Bitumen from Oil Sand by Ultracentrufigation," Fuel, 71(12), 1515-18 (1992).

"Improved Displacement and Sweep Efficiency in Gas Flooding," CPGE Reservoir Engineering, http://www.cpge.utexas.edu/re/gas_flooding.html, pp 1-2, printout dated Jul. 17, 2003.

Kimmel, T. B., "Heavy Oil Emulsion Treating in Canada, " 3rd Int'l Unitar/UNDP Heavy Crude & Tar Sands Conf. (Long Beach Calif., 7/22-31/85) Preprints V. 4, pp. 1970-1979 (1985) (Paper No. HCTS/CF 3/15 6).

Levine, S. and Bowen, B.D. "Capillary interaction of spherical particals adsorbed on the surface of an oil/water droplet stabilized by the particles. Part I", Colloids and Surfaces, 59 (1991) pp. 337-386.

Levine, S. and Bowen, B.D. "Capillary interaction of spherical particles adsorbed on the surface of an oil/water droplet stabilized by the particles. Part II", Colloids and Surfaces, 65 (1992) pp. 273-286.

Leuchenberg, Chiristian et al., "Development and Performance of Surface Equipment for high Temperature Underbalance Drilling in a Sour, Severely Under Pressure Formation," Energy Sources Technology Conference & Exhibition, ASME, ETCE99-6618 (1999).

ABSTRACT OF: Masliyah, Jacob et al., "Emulsion Studies Associated with Bitumen Recovery from Canadian Oil Sands: Part I," Pre-print Archive, American Institute of Chemical Engineers, Spring National Meeting, pp. 1648-1654, (Mar. 11-14, 2002) (ABSTRACT ONLY).

Mendoza, Humberto et al., "Effect Of Injection Rate On Emulsion Flooding For A Canadian And A Venezuelan Crude Oil", *CIM/AOSTRA 1991 Technical Conference*(Apr. 21-24, 1991) Paper No. CIM/AOSTRA 91-26, pp. 26-1 to 26-6.

Menon, V.B. and Wasan, D.T. "Characterization of Oil-Water Interfaces Containing Finely Divided Solids with Applications to the Coalecence of Water-in-Oil Emulsions: A Review", Colloids and Surfaces, 29 (1988) pp. 7-27.

Mikula, R.J. et al., "Microscopic Characterization of Emulsion Interfaces", 1998 Eastern Oil Shale Symposium (Nov. 15-17, 1989) Institute for Mining and Minerals Research, University of Kentucky, pp. 287-292.

Pal, R. et al., "Rheology of Clay-in-Oil Suspensions with Added Water Droplets,"Chemical Engineering Science, vol. 47, No. 5, pp. 967-70 (Apr. 1992).

Petroleum Engineering Department, Colorado School of Mines, "Foam and Conformance Technologies (FACT)," FACT News, http://www.mines.edu/research/fact/indexold.html, pp. 1-7 (May 1996).

Preuss, K. annd Wu, Y.S., "On PVT-Data, Well Treatment, and Preparation of Input Data for an Isothermal Gas-Water-Foam Version of MULKOM,"Earth Sciences Division, Lawrence Berkeley Laboratory, Univ. of Calif., Prepared for Gas Research Institute, GRI Contract No. 5086-271-1160 (Aug. 1988).

Price-Smith, C. et al., "Laboratory Development of A Novel, Synthetic Oil-Based Reservoir Drilling and Gravel-Pack Fluid System that Allows Simultaneous Gravel-Packing and Cake-Cleanup in Open-Hole Completions", SPE Asia Pacific Oil & Gas Conference, SPE64399, 6 pp., (2000).

Rege, S.D. and Fogler, H.S. "A Network Model for Deep Bed Filtration of Solid Particles and Emulsion Drops", *AIChE Journal*, vol. 34, No. 11 (Nov. 1988) pp. 1761-1772.

Reilly, Bernard T. and Scott, George R., "Cold Lake Recovery and the Role of Foamy Emulsion, "SPE 30287, International Heavy Oil Symposium, Calgary, Alberta, Canada (Jun. 19-21, 1995).

Reppert, T.R. et al., "Second Ripley Surfactant Flood Pilot Test, " 7th SPE/DOE Enhanced Oil Recovery Symposium (tulsa, 4/22-25/90) Proc., pp. 463-474 (1990) (SPE/DOE-20219).

Sarbar, M. et al., The Effect of Chemical Additives on the Stability of Oil-In-Water Emulsion Flow Through Porous Media, 38th Annu CIM Petrol Soc Tech Mtg (Calgary, Canada, 6/7-10/87) preprints V. 2, pp. 431-453 (1987) (Paper No. 87-38-25).

Sarma, H. K. et al., "Evaluation of Emulsified Solvent Flooding for Heavy Oil Recovery," 46th Annu CIM Petrol Soc Mtg (Banff, Canada, 5/14-17/95) Proc V.2, Paper No. CIM 95-66 (1995).

Schramm, Laurier L., "Foams Can Be Effective in the Presence of Oil," http://www.ucalgary.ca/~schramm/foamoil.htm, pp. 1-3 (1996).

Soo, H. et al., "A Filtration Model For The Flow Of Dilute, Stable Emulsions In Porous Media-Ii. Parameter Evaluation And Estimation", *Chemical Engineering Science*, vol. 41, No. 2 (1986) pp. 273-281.

Sundstrom, Donald W. and Klei, Herbert E. "Wastewater Treatment", *Department of Chemical Engineering, The University of Connecticut* (1979) pp. 10-13.

Takamara, K. and Chow, R., "The Stability of Bitumen Emulsion", Energy Process v. 74, No. 7, pp. 29-31, (Sep.-Oct 1982).

Thomas, F. Brent et al., "Water Shutoff Treatments-Reduce Water Accelerate Oil Production", Paper No. 98-47, 49th Annual Technical Meeting of the Petroleum Society of CIM, Calgary, Alberta, Canada, Jun. 8-10 (1998).

Thompson, D.G. et al., "Emulsification and demulsification related to crude oil production,"Colliods and Surfaces, vol. 15 (3-4) pp. 175-89 (1985).

Tronov, V.P. and Shireyev, A.I. "Effect Of Stratal Water On Rheological And Demulsification Properties Of Forming Emulsions", Tatar Scientific Research and Planning Institute of the Petroleum Industry (1991).

United States Department of Energy Office of Fossil Energy , Project Fact Sheet, "Development of More-Efficient Gas Flooding Applicable to Shallow Reservoirs/Mega PRD," http://dominoweb.fossil.energy.gov/domino, pp. 1-3, printout date Jul. 17, 2003.

Yan, N. et al., "On water-in-oil emulsions stabilized by fine solids," Colliods and Surfaces, A: Physicochemical and Engineering Aspects, vol. 193, pp. 97-107 (2001).

Yan, Zhoulin et al., "Roles of Various Bitumen Components in the Stability of Water-in-Diluted-Bitumen Emulsions," J. Colliod and Interface Science, vol. 220, pp. 329-337 (1999).

Yang, S.H. and Reed, R.L., "Mobility Control Using $CO_2$ Forms," SPE 19689, 64th Annual Technical Conference Exhibition of the Society of Petroleum Engineers, San Antonio, TX (Oct. 8-11, 1989).

ABSTRACT OF: Yeung, K. "Mobility Control By Emulsions Under Bottom Water Conditions," Alberta University, MS Thesis, 1992, Masters Abstr Int V 30, No. 4, p. 1472, Winter (1992). (ABSTRACT ONLY).

Yuan, F. and Pal, R. "Composition Measurement Of Emulsions And Emulsions With Added Solids Using A Microwave Technique", Sixth Petroleum Conference of The Petroleum Society of CIM, (Oct. 16-18, 1995) Paper No. 95-148, pp. 1-15.

Zhou, Z. A. et al., "Interaction of Ionic Species and Fine Solids with a Low Energy Hydrophibic Surface from Contact Angle Measurement," J. Colloid and Interface Science vol. 204, pp. 342-349 (1998).

Gorbunov, A. T. et al., "In Situ Emulsification During Thermal Alkali Flooding, " Neft Khoz No. 7, pp. 42-45, (Jul. 1984) (with English language translation).

International Preliminary Examination Report mailed Feb. 6, 2003 for International Patent Application No. PCT/US01/1185, filed Nov. 8, 2001, 4 pages.

* cited by examiner

STABILITY ENHANCED WATER-IN-OIL EMULSION AND METHOD FOR USING SAME

REFERENCE TO RELATED APPLICATIONS

This application claims the benefit of U.S. Provisional Patent Application Nos. 60/199,458, 60/199,546, and 60/199,643 each filed Apr. 25, 2000.

FIELD OF THE INVENTION

The present invention relates to a water-in-oil emulsion used for enhanced oil recovery. More specifically, the stability of a water-in-oil emulsion is enhanced by pretreating at least a portion of the oil prior to emulsification. The pretreatment step can be accomplished by adding polymers to the oil, biotreating the oil, photochemically treating the oil and combinations thereof. Solid particles may also be added to the oil prior to emulsification to further stabilize the water-in-oil emulsion. The emulsion may be used as a drive fluid to displace hydrocarbons from a subterranean formation or as a barrier fluid for diverting the flow of hydrocarbons in the formation.

BACKGROUND OF THE INVENTION

It is well known that a significant percentage of oil remains in a subterranean formation after the costs of primary production rise to such an extent that further oil recovery is cost ineffective. Typically, only one-fifth to one-third of the original oil in place is recovered during primary production. At this point, a number of enhanced oil recovery (EOR) procedures can be used to further recover the oil in a cost-effective manner. These procedures are based on re-pressuring or maintaining oil pressure and/or mobility.

For example, waterflooding of a reservoir is a typical method used in the industry to increase the amount of oil recovered from a subterranean formation. Waterflooding involves simply injecting water into a reservoir, typically through an injection well. The water serves to displace the oil in the reservoir to a production well. However, when waterflooding is applied to displace viscous heavy oil from a formation, the process is inefficient because the oil mobility is much less than the water mobility. The water quickly channels through the formation to the producing well, bypassing most of the oil and leaving it unrecovered. For example, in Saskatchewan, Canada, primary production crude has been reported to be only about 2 to 8% of the original oil in place, with waterflooding yielding only another 2 to 5% of that oil in place. Consequently, there is a need to either make the water more viscous, or use another drive fluid that will not channel through the oil. Because of the large volumes of drive fluid needed, it must be inexpensive and stable under formation flow conditions. Oil displacement is most efficient when the mobility of the drive fluid is significantly less than the mobility of the oil, so the greatest need is for a method of generating a low-mobility drive fluid in a cost-effective manner.

Oil recovery can also be affected by extreme variations in rock permeability, such as when high-permeability "thief zones" between injection wells and production wells allow most of the injected drive fluid to channel quickly to the production wells, leaving oil in other zones relatively unrecovered. A need exists for a low-cost fluid that can be injected into such thief zones (from either injection wells or production wells) to reduce fluid mobility, thus diverting pressure energy into displacing oil from adjacent lower-permeability zones.

In certain formations, oil recovery can be reduced by coning of either gas downward or water upward to the interval where oil is being produced. Therefore, a need exists for a low-cost injectant that can be used to establish a horizontal "pad" of low mobility fluid to serve as a vertical barrier between the oil producing zone and the zone where coning is originating. Such low mobility fluid would retard vertical coning of gas or water, thereby improving oil production.

For moderately viscous oils—i.e., those having viscosities of approximately 20–100 centipoise (cP)—water-soluble polymers such as polyacrylamides or xanthan gum have been used to increase the viscosity of the water injected to displace oil from the formation. For example, polyacrylamide was added to water used to waterflood a 24 cP oil in the Sleepy Hollow Field, Nebr. Polyacrylamide was also used to viscosify water used to flood a 40 cP oil in the Chateaurenard Field, France. With this process, the polymer is dissolved in the water, increasing its viscosity.

While water-soluble polymers can be used to achieve a favorable mobility waterflood for low to moderately viscous oils, usually they cannot economically be applied to achieving a favorable mobility displacement of more viscous oils—i.e., those having viscosities of approximately 100 cP or higher. These oils are so viscous that the amount of polymer needed to achieve a favorable mobility ratio would usually be uneconomic. Further, as known to those skilled in the art, polymer dissolved in water often is desorbed from the drive water onto surfaces of the formation rock, entrapping it and rendering it ineffective for viscosifying the water. This leads to loss of mobility control, poor oil recovery, and high polymer costs. For these reasons, use of polymer floods to recover oils having viscosities in excess of 100 cP is not usually technically or economically feasible. Also, performance of many polymers is adversely affected by levels of dissolved ions typically found in formations, placing limitations on their use and/or effectiveness.

Water and oil macroemulsions have been proposed as a method for producing viscous drive fluids that can maintain effective mobility control while displacing moderately viscous oils. For example, water-in-oil and oil-in-water macroemulsions have been evaluated as drive fluids to improve oil recovery of viscous oils. Such emulsions have been created by addition of sodium hydroxide to acidic crude oils from Canada and Venezuela. The emulsions were stabilized by soap films created by saponification of acidic hydrocarbon components in the crude oil by sodium hydroxide. These soap films reduced the oil/water interfacial tension, acting as surfactants to stabilize the water-in-oil emulsion. It is well known, therefore, that the stability of such emulsions substantially depends on the use of sodium hydroxide (i.e., caustic) for producing a soap film to reduce the oil/water interfacial tension.

Various studies on the use of caustic for producing such emulsions have demonstrated technical feasibility. However, the practical application of this process for recovering oil has been limited by the high cost of the caustic, likely adsorption of the soap films onto the formation rock leading to gradual breakdown of the emulsion, and the sensitivity of the emulsion viscosity to minor changes in water salinity and water content. For example, because most formations contain water with many dissolved solids, emulsions requiring fresh or distilled water often fail to achieve design potential because such low-salinity conditions are difficult to achieve and maintain within the actual formation. Ionic species can be dissolved from the rock and the injected fresh water can mix with higher-salinity resident water, causing breakdown of the low-tension stabilized emulsion.

Various methods have been used to selectively reduce the permeability of high-permeability "thief" zones in a process generally referred to as "profile modification." Typical agents that have been injected into the reservoir to accomplish a reduction in permeability of contacted zones include polymer gels or cross-linked aldehydes. Polymer gels are formed by crosslinking polymers such as polyacrylamide, xanthan, vinyl polymers, or lignosulfonates. Such gels are injected into the formation where crosslinking reactions cause the gels to become relatively rigid, thus reducing permeability to flow through the treated zones.

In most applications of these processes, the region of the formation that is affected by the treatment is restricted to near the wellbore because of cost and the reaction time of the gelling agents. Once the treatments are in place, the gels are relatively immobile. This can be a disadvantage because the drive fluid (for instance, water in a waterflood) eventually finds a path around the immobile gel, reducing its effectiveness. Better performance should be expected if the profile modification agent could slowly move through the formation to plug off newly created thief zones, penetrating significant distances from injection or production wells.

McKay, in U.S. Pat. No. 5,350,014, discloses a method for producing heavy oil or bitumen from a formation undergoing thermal recovery. McKay describes a method for producing oil or bitumen in the form of oil-in-water emulsions by carefully maintaining the temperature profile of the swept zone above a minimum temperature, $T_c$. If the temperature of the oil-in-water emulsion is maintained above this minimum temperature, the emulsion will be capable of flowing through the porous subterranean formation for collection at the production well. McKay describes another embodiment of his invention, in which an oil-in-water emulsion is inserted into a formation and maintained at a temperature below the minimum temperature. This immobile emulsion is used to form a barrier for plugging water-depleted thief zones in formations being produced by thermal methods, including control of vertical coning of water. However, the method described by McKay requires careful control of temperature within the formation zone and, therefore, is useful only for thermal methods of recovery. Consequently, the method disclosed by McKay could not be used for non-thermal (referred to as "cold flow") recovery of heavy oil.

A new process has recently been disclosed that uses novel solids-stabilized emulsions for enhanced oil recovery. The added solid particles help stabilize the oil and water interface to provide enhanced stability to the emulsion. U.S. Pat. No. 5,927,404 describes a method of using the novel solids-stabilized emulsion as a drive fluid to displace hydrocarbons for enhanced oil recovery. U.S. Pat. No. 5,855,243 claims a similar method of using a solids-stabilized emulsion, whose viscosity is reduced by the addition of a gas, as a drive fluid. U.S. Pat. No. 5,910,467 claims the novel solids-stabilized emulsion described in U.S. Pat. No. 5,855,243. Pending U.S. patent application Ser. No. 09/290,518 describes a method for using the novel solids-stabilized emulsion as a barrier for diverting the flow of fluids in the formation.

Preparing an emulsion with optimum properties is key to successfully using the emulsion for enhanced oil recovery. Two important properties for using an emulsion in EOR processes are an emulsion's stability and its rheology. The emulsion should be shelf-stable, that is, the emulsion should be able to remain a stable emulsion without water or oil breakout when left undisturbed. In addition, the emulsion should be stable under flow conditions through porous media, i.e. in a subterranean formation. The emulsion's rheological characteristics are also important. For instance, EOR methods for which this emulsion may be used include injecting the emulsion as a drive or barrier fluid into a subterranean formation. Accordingly, the emulsion should have an optimum viscosity for injection and to serve as either a drive or barrier fluid. In practicing EOR, and particularly with using the emulsion as a drive fluid, it is useful to match the rheology of the emulsion with the rheology of subterranean oil to be produced. Oil displacement using a drive fluid is typically more efficient when the drive fluid has a greater viscosity than that of the oil to be displaced.

Because water and oil are readily available at most production sites, water-in-oil emulsions are a good choice for making the emulsions for EOR. Some oils possess the chemical composition and physical properties necessary to make stable water-in-oil emulsions. Examples of such compositions are polar and asphaltene compounds. However, if the oil does not contain the right type and sufficient concentration of polar and asphaltene compounds, the oil may not form stable water-in-oil emulsions. The previously cited art related to solids-stabilized emulsions suggests that asphaltenes or polar hydrocarbons may be added to these oils to improve their ability to form stable emulsions. U.S. Pat. No. 5,855,243, column 7, lines 6–10; U.S. Pat. No. 5,927,404 column 6, lines 44–47; U.S. Pat. No. 5,910,467 column 7, lines 3–6. However, this addition is not always successful because incompatibility between some oil components and the added asphaltenes and polars can result in phase separation or rejection of the added compounds. These cases limit the scope of the inventions disclosed in the U.S. Patents cited above.

Accordingly, there is a need for a method to produce an emulsion that can be made economically and is capable of performing under a wide range of formation conditions, including salinity, temperature and permeability. The present invention satisfies this need.

SUMMARY OF THE INVENTION

According to the invention, there is described a method for enhancing the stability of a water-in-oil emulsion comprising pretreating at least a portion of the oil prior to emulsification.

In one embodiment of the invention, the oil pretreatment step comprises the addition of a polymer to the oil prior to emulsification.

In another embodiment of the invention, the oil pretreatment step comprises biotreating the oil prior to emulsification.

In another embodiment of the invention, the oil pretreatment step comprises photochemically treating the oil prior to emulsification.

Combinations of these embodiments may also be used
Further disclosed is a method for producing hydrocarbons from a subterranean formation, comprising:

a) preparing a water-in-oil emulsion with pretreated oil;
b) contacting the formation with said emulsion, and
c) producing hydrocarbons from the formation using said emulsion.

Further disclosed is the water-in-oil emulsion, at least a portion of the oil being pretreated oil.

Optionally, solid particles may be added to the oil, either before or after the pretreatment step, to further enhance the stability of the emulsion.

DETAILED DESCRIPTION OF THE INVENTION

The current invention is a method for enhancing the stability of a water-in-oil emulsion comprising pretreating at least a portion of the oil prior to emulsification. The pretreatment step may comprise adding a polymer to the oil, biotreating the oil, photochemically treating the oil, or combinations thereof. Solid particles may also be added to the oil, before or after the pretreatment step, to further enhance the stability of the emulsion. The novel emulsion can be used as a drive fluid to displace hydrocarbons in a subterranean formation, or used as a barrier fluid to divert the flow of hydrocarbons within a subterranean formation.

Accordingly, the present invention describes a method of pretreating oil to increase the stability of a water-in-oil emulsion. Several embodiments of this invention will now be described. As one of ordinary skill in the art can appreciate, an embodiment of this invention may be used in combination with one or more other embodiments of this invention, which may provide synergistic effects in stabilizing the water-in-oil emulsion.

The term "oil" as used in the specification, including the claims, comprises oil of any type or composition, including but not limited to crude oil, refined oil, oil blends, chemically treated oils, or mixtures thereof. Crude oil is unrefined liquid petroleum. Refined oil is crude oil that has been purified in some manner, for example, the removal of sulfur. Crude oil is the preferred oil used to practice this invention, more preferably, the crude oil is produced from the formation where the emulsion is to be used. The produced crude oil may contain formation gas, or formation water or brine mixed with the oil. It is preferred to dehydrate the crude oil prior to treatment, however, mixtures of oil, formation gas and/or formation brine may also be used in this invention.

1. Pretreatment by Addition of a Polymer

To make a polymer stabilized water-in-oil emulsion, a polymer is added to the oil prior to emulsification. The water-in-oil emulsion is formed by adding water in and mixing for a time sufficient to disperse the water as small droplets in the continuous oil phase.

Polymers useful for this invention are preferably polymers, copolymers or tert polymers that either contain reactive and/or interactive functionalities or are capable of being functionalized. Accordingly, the term polymer as used herein includes polymers, copolymers, tert polymers and combinations thereof. Non-limiting examples of reactive and/or interactive functionalities are maleic anhydride, carboxylic acid, sulfonic acid, carboxylates, sulfonates and sulfates. Polymers that are capable of being functionalized in the oil typically, but not exclusively, contain aromatic or olefinic characteristics. The preferred concentration of polymer is from about 0.01% to about 1% based on the weight of the oil. The polymers should be either oil soluble or water soluble, but are preferably oil soluble polymers.

A sulfonating agent may be used to functionalize the polymers that are capable of being functionalized, which can provide additional stability to the emulsion. The preferred sulfonating agent is concentrated sulfuric acid. The preferred treat rate of sulfuric acid to oil is between 0.5 to 5 wt %, more preferably 1 to 3 wt %, based on the weight of oil. The sulfonating agent can be used alone or in combination with other sulfonating agents. Such sulfonating agents are generally described in E. E. Gilbert, *Sulfonation and Related Reactions, Interscience*, New York, (1965). Other sulfonating agents that may be useful in this invention include fuming sulfuric acid, sulfur trioxide, alkali disulfates, pyrosulfates, chlorosulfonic acid and a mixture of manganese dioxide and sulfurous acid.

As one of ordinary skill in the art can appreciate, the amount of sulfonation useful in the present invention can be adjusted according especially to the asphaltene and resin content of the oil and the sulfonating agent used. Asphaltenes are natural components in crude oil, which help stabilize the oil-water interface of water-in-oil emulsions. Accordingly, an oil containing a large amount of asphaltene may require less sulfonation than one containing a small amount of asphaltene. Typically, the concentration of the sulfonation agent will be from about 0.1% to about 15% based on the weight of the oil.

The sulfonation procedure results in chemical modifications to the oil and the polymers that are capable of being functionalized:

a) the functionalizable components in the oil, or components containing unsaturated and/or aromatic groups, are converted to the corresponding sulfonates and/or sulfonic acid salts. These salts are more surface-active than the base components themselves and thus contribute to improving the stability of the water-in-oil emulsion, b) if napthenic acids are present in the oil, sulfonation will markedly enhance their acidity and interfacial activity through the chemically-attached sulfonate groups, and c) the polymers will be functionalized, which will contribute to the stability of the water and oil interface.

The sulfonation step can occur before or after the addition of the polymer. Because the polymer will be functionalized as a result of the sulfonation, and as a result contribute to the stability of the emulsion, it is preferred to add the polymer to the oil and then perform the sulfonation step.

After the oil is treated with the polymer, and is sulfonated if the sulfonation step is used, water is added in small aliquots or continuously and the mixture is subjected to shear mixing (e.g. at 1000 to 12000 revolutions/minute or rpm) for a time sufficient to disperse the water as small droplets in the continuous oil phase. Preferably, formation water is used to make the emulsion, however, fresh water can also be used and the ion concentration adjusted as needed to help stabilize the emulsion under formation conditions. It is preferred to have a water concentration in the water-in-oil emulsion of 40 to 80%, more preferably 50 to 65%, and most preferably 60%.

The pH of the emulsion can be adjusted by adding a calculated amount of a weak base to the emulsion and shear mixing for a time sufficient to raise the pH to the desired level, preferably in the 5–7 range. The preferred base for this pH adjustment is ammonium hydroxide. Stronger bases like sodium hydroxide, potassium hydroxide and calcium oxide may have a negative effect on emulsion stability. A possible explanation is that these strong bases tend to invert the emulsion from a water-in-oil to an oil-in-water emulsion, which is undesirable for the process of this invention. Adjusting the pH is optional as in some, but not all, cases it is desirable to inject an acidic emulsion and allow the reservoir formation to buffer the emulsion to the reservoir alkalinity.

Optionally, solid particles can be added to further enhance the stability of the water-in-oil emulsion. Such solids-stabilized emulsions are disclosed in U.S. Pat. Nos. 5,927,404, 5,910,467, 5,855,243 and 6,068,054. U.S. Pat. No. 5,927,404 describes a method of using the novel solids-stabilized emulsion as a drive fluid to displace hydrocarbons for enhanced oil recovery. U.S. Pat. No. 5,855,243 claims a similar method of using a solids-stabilized emulsion, whose viscosity is reduced by the addition of a gas, as a drive fluid. U.S. Pat. No. 5,910,467 claims the novel solids-stabilized emulsion described in U.S. Pat. No. 5,855,243. U.S. Pat. No. 6,068,054 describes a method for using the novel solids-stabilized emulsion as a barrier for diverting the flow of fluids in the formation.

As disclosed in the above referenced U.S. patents, the solid particles should have certain physical properties. The individual particle size should be sufficiently small to provide adequate surface area coverage of the internal droplet phase. If the emulsion is to be used in a porous subterranean formation, the average particle size should be smaller than the average diameter of pore throats in the porous subterranean formation. Methods for determining average particle size are discussed in the previously cited U.S. patents. The solid particles may be spherical in shape, or non-spherical in shape. If spherical in shape, the solid particles should preferably have an average size of about five microns or less in diameter, more preferably about two microns or less, even more preferably about one micron or less and most preferably, 100 nanometers or less. If the solid particles are non-spherical in shape, they should preferably have an average size of about 200 square microns total surface area, more preferably about twenty square microns or less, even more preferably about ten square microns or less and most preferably, one square micron or less. The solid particles must also remain undissolved in both the oil and water phase of the emulsion under the formation conditions.

The solid particulates used in conjunction with polymer pretreatment preferably possess an oleophilic nature. Typical inorganic particulates that are useful include layered silicates, clays, fumed and precipated silicas, and nonlayered particulates. Typical organic particulates include unfunctionalized and functionalized carbon blacks, asphalts, soot, fibers, and asphaltenes. The particulates can also be treated to obtain an oleophilic quality. Such procedures for forming oleophilic particulates are generally known in the art and include silane coupling agent technology, and adding surfactants and lignosulfonates. Mixtures of particulates are also useful in this invention. The preferred concentration of the solid particles is from about 0.01 wt % about 10 wt % based on the weight of the oil.

If the step of adding a sulfonating agent is used in conjunction with the solid particle addition, the sulfonation procedure will functionalize the surface of the solids and thus modify the solids' surface to improve the interaction with the surface-active components of the oil. Accordingly, it is preferred to add the solid particles before sulfonation, although the solids may also be added after the sulfonation step.

Oleophilic particulates may be formed through functionalization of the oil itself, for instance through sulfonation. However, other functionalization chemistries are available and are known in the art, for example as described in, *Advanced Organic Chemistry*, J. March, Third Edition, J. Wiley & Sons (1985). These functionalized species form aggregates in the preferred size range described above. Due to their chemical nature and structure, these particulates are interfacially active and will strongly enhance stability of the emulsion.

While pretreatment of the entire quantity of crude oil necessary to make an emulsion is feasible by the method of this invention, it is also possible to treat a slipstream or master batch of oil and subsequently mix the slipstream with a main stream of oil prior to water addition and emulsification. This main stream of oil is preferably untreated crude oil, however, it may be any oil, including oil that has been treated to enhance its ability to form a stable emulsion or treated to optimize its rheology. If the slipstream method is used, the amount of polymers, solid particles (if any) and sulfonating agent (if any) for the slipstream treatment is scaled accordingly to obtain the desired amounts in the resulting emulsion.

EXAMPLES

This invention has been demonstrated on several different crude oils that do not form stable water-in-oil emulsions. However, as shown in these examples, by using the inventive method disclosed herein stable water-in-oil emulsions were formed.

Emulsions prepared by the foregoing methods were subjected to the following tests:
 1. Shelf stability at 25° C. for 48 hours
 2. Optical microscopy and NMR for determination of water droplet size/size distribution
 3. Centrifuge stability (see Appendix-1)
 4. Emulsion stability: flow through a sand pack (details of the micropercolation test procedure is given in Appendix-1)
 5. Emulsion rheology using a Brookfield® viscometer (cone (#51) and plate configuration) at 60° C. in a shear range of 1.92 to 384 $\sec^{-1}$.

Example 1

Crude Oil #1 was sulfonated according to the following procedure: 12 grams (g) of the crude oil was combined with 0.36 g concentrated sulfuric acid (96 wt %). This represents 3 parts of acid per 100 parts of oil. This mixture was stirred on a hot plate with a magnetic stirrer attachment at 55° C. for 24 hours.

The sulfonated crude oil (12 g) was then combined with 0.1 wt % (based on the weight of the crude oil) maleated ethylene propylene copolymer (EP) (product of Exxon Chemical, Houston, Tex.), which was added to the sulfonated crude oil and stirred at 55° C. for an additional 24 hours. The solution was cooled to room temperature and the pH was adjusted to 7.3 using an ammonium hydroxide solution. A synthetic brine solution 18 g (comprised of 9.4 g sodium chloride, 3.3 g $CaCl_2$ (calcium chloride).$2H_2O$, 0.48 $MgCl_2$ (magnesium chloride).$6H_2O$, and 0.16 g potassium chloride per liter of distilled water) was added to the sulfonated oil and copolymer mixture as follows: the sulfonated oil—copolymer mixture was mixed in a Glas-Col 099A S30A25 high shear mixer for 15 minutes at 5000 rpm to ensure homogenity. The synthetic brine solution was added either dropwise or continuously during mixing. The emulsion thus formed was mixed for an additional 15 minutes at 7500 rpm.

The resulting polymer stabilized water-in-crude oil emulsion had an aqueous phase droplet diameter of less than 4 microns, with a majority of particles less than 3 microns as identified by light microscopy. The emulsion was shelf-stable, and showed no brine breakout under the microcentrifuge test. This emulsion was also stable under the micropercolation test as indicated by a 1.6% brine breakout.

Example 2

Crude Oil #2 containing 0.05 wt % of maleated EP copolymer was sulfonated according to the procedure described above. The speed of the mixer in all stages of the emulsion preparation was increased to 7500 rpm due to the viscosity of the crude oil component. The pH of the solution was adjusted to 7.0 using a concentrated ammonium hydroxide solution. The brine breakout of the 60/40 polymer stabilized water-in-crude oil emulsion, as demonstrated by the micropercolation test, was 0%. Droplet diameters were less than 3 microns. The emulsion was also stable under the microcentrifuge test showing no brine breakout and was shelf stable.

Rheological evaluation using a cone and plate viscometer demonstrated high emulsion stability under shearing conditions.

Example 3

Example 2 was repeated using 0.1 wt % maleated EP copolymer, instead of 0.05 wt % maleated EP copolymer. Again, the pH of the resulting emulsion was adjusted to approximate the as-received Crude Oil #2 level (~7 pH) by adding a calculated amount of concentrated ammonium hydroxide. The brine breakout was found to be 0% under the micropercolation test using Berea sand. The emulsion was stable under the microcentrifuge test, and was shelf stable. Extensive light microscopy examination of the emulsion shows particle diameters less than 3 microns.

Example 4

A crude oil blend (50/50 wt % mixture of Crude Oil #2 and a low viscosity crude oil, Crude Oil #3) was prepared and sulfonated as described previously. In this example, 0.05 wt % maleated EP copolymer was used. The pH was adjusted to 7.1 using a concentrated ammonium hydroxide solution. The mixing speed used to prepare the emulsion ranged from 5000–7000 rpm. The brine breakout was evaluated and found to be 0% under the micropercolation test. The emulsion was also stable under the microcentrifuge test showing no brine breakout and was shelf stable. Extensive light microscopy was used to evaluate particle diameter, which in this case was less than 3 microns.

2. Pretreatment by Biotreating the Oil

Another pretreatment method to enhance the stability of a water-in-oil emulsion comprises the step of biotreating at least a portion of the oil prior to emulsification. The water-in-oil emulsion made from the biotreated oil has enhanced stability over water-in-oil emulsions made with untreated oil. Oil degrading microbes are used in the biotreatment process.

To biotreat the oil, the oil is placed in a bioreactor or similar holding vessel. Water should be present in the reactor, preferably at a volume of 10 to 100 times the volume of the oil. Oil-degrading microbes are added to the reactor at a preferred rate of 0.1 wt % to 5 wt % inoculum based upon the weight of the bioreactor water. Inoculum is a culture of microbes contained in an aqueous medium. The concentration of microbes in the inoculum is measured by colony forming units (CFU). Typically the CFU count for microbes in the inoculum will range between $10^3$ to $10^9$ CFU. These CFU determinations are known to those of ordinary skill in the art. The oil degrading microbes can be obtained from an oil waste-water treatment facility.

Nutrients can be provided to feed the microbes. The nutrients will preferably contain nitrogen and phosphorous, and which more preferably have a carbon to nitrogen to phosphorus (C:N:P) ratio of 100:10:1 to 100:10:0.1. Optionally, other nutrients including, without limitation, copper metal salt, iron metal salt, magnesium metal salt or cobalt metal salt may also be added to the bioreaction. Air or oxygen is purged into the bioreactor at a preferred rate of about 5 to 3000 cubic centimeters per minute. The temperature of the bioreactor should be between about 20 to 70° C.

It is believed that this biotreatment step has the following affect on the oil that promotes enhanced stability of a water-in-oil emulsion:

a) Some of the aliphatic components of oil are oxidized and polar ketones or acid functionality are introduced on the aliphatic chain. Organo sulfur compounds are also susceptible to oxidization and can form corresponding sulfoxides. The oxygenated compounds are more surface active than the aliphatic components themselves and thus contribute to improving the stability of the water-in-oil emulsion.

b) If naphthenic acids are present as salts of divalent cations like calcium, bio-oxidation is likely to convert these salts to decarboxylated naphthenic hydrocarbons or lower carbon number naphthenic acids and the corresponding metal oxide. These constituents serve to enhance the stability of the water-in-oil emulsion.

c) In the process of biotreating oil, the aqueous phase of the bioreaction also undergoes substantial changes. Upon completion of the bioreaction, the aqueous phase is a dispersion of biosurfactants (rhammanolipids produced by the microbes) and dead microbe cells. These components act synergistically to enhance the stability of water-in-oil emulsions. The aqueous phase of the bioreaction may therefore be used to make the water-in-oil emulsion, and serve to further enhance the stability of the resulting emulsion.

After the biotreatment step, the biotreated oil can be separated from the aqueous phase of the bioreaction prior to forming a water-in-oil emulsion with the biotreated oil. However, it is preferred to form an emulsion using both the biotreated oil and the aqueous phase of the bioreaction as the aqueous phase contains components that will help further enhance the stability of the resulting water-in-oil emulsion, as described above.

The water-in-oil emulsion is formed by adding water to the biotreated oil, which may or may not include the aqueous phase of the bioreaction, in small aliquots or continuously and subjecting the mixture to shear mixing (e.g. at 6000 to 12000 rpm) for a time sufficient to disperse the water as small droplets in the continuous oil phase. Preferably, formation water is added to make the emulsion. However, fresh water can be used and the ion concentration adjusted as needed to help stabilize the emulsion under formation conditions. Preferably, the water droplets in the water-in-oil emulsion will be 5 microns or less in size. It is preferred to have a water concentration in the water-in-oil emulsion of 40 to 80%, more preferably 50 to 65%, and most preferably 60%.

Optionally, sub-micron or micron sized solid particles can be added to the oil prior to forming the emulsion, as previously discussed, to further enhance the stability of the emulsion.

For this embodiment, it is preferred to have solid particles that are hydrophilic or hydrophobic in nature. The solid particles can be added after the oil is biotreated, however, it is preferred to add the solid particles and then biotreat the oil-solid particle mixture. If the solid particles are present during the biotreatment process, the polar oxygenated products that result from the biotreatment process adsorbs on to the surface of the solids, thereby rendering them amphiphilic or enhancing their amphiphilic nature. Amphiphilic material has both hydrophobic and hydrophilic characteristics. The enhanced amphiphilic nature of the solid particles increases their effectiveness as stabilizers at the oil and water interface. Fumed silica, sold under the trade name Aerosil® R 972 or Aerosil® 130 (products of DeGussa Corp.), divided bentonite clays, kaolinite clays, organophilic or carbonaceous asphaltenic solids are the preferred solids. The preferred treat rate for solids is 0.05 to 0.25 wt % based on the weight of the oil.

The biotreatment step may be used in conjunction with acid treatment to provide additional stability to the resulting water-in-oil emulsion. The acid treatment consists of adding dilute acid to the oil prior to emulsification. The acid is preferably added to the oil after the biotreatment step as the acid content may harm the microbes used for oil degradation and diminish their effectiveness as oil degraders. The acid can be added at a preferred rate of between 8 to 30,000 ppm based on the weight of the oil, more preferably 10 to 80 ppm, and even more preferably 8 to 20 ppm. The dilute acid can be mineral or organic acid. Dilute sulfuric acid is the preferred mineral acid, however other mineral acids like hydrochloric acid, perchloric acid, and phosphoric acid may also be used. The preferred organic acid is acetic acid. However, other organic acids like para-toluene sulfonic, alkyl toluene sulfonic acids, mono di and trialkyl phosphoric acids, organic mono or di carboxilic acids, e.g. formic, C3 to C16 organic carboxylic acids, succinic acid and petroleum naphthenic acid are also effective in this embodiment. Mixtures of mineral acids, mixtures of organic acids or combinations of mineral and organic acids may be used to produce the same effect. Petroleum naphthenic acid or crude oils containing a high concentration of naphthenic acid can be added to provide the enhanced stability.

If this acid treatment is used, the pH of the resulting emulsion can be adjusted by adding a calculated amount of a weak base to the emulsion and shear mixing for a time sufficient to raise the pH to a desired level, preferably to a pH of between 5–7. Ammonium hydroxide is the preferred base. Stronger bases like sodium hydroxide, potassium hydroxide and calcium oxide have a negative effect on emulsion stability, as these strong bases tend to invert the emulsion from a water-in-oil emulsion to an oil-in-water emulsion, which is undesirable for the purposes of the present invention. Adjusting the pH is optional, as in some cases it is desirable to inject an acidic emulsion and allow the reservoir formation to buffer the emulsion to the reservoir alkalinity.

One may also blend the biotreated oil with thermally treated oil to further stabilize and/or reduce the viscosity of the resulting water-in-oil emulsion. Thermally treated oils are discussed in correspondingly filed patent application _____, related to solids-stabilized emulsions. The emulsion formed from the biotreated oil can also have its viscosity reduced by the addition of gas.

The preferred process is to biotreat a slipstream or master batch of oil and subsequently mix the slipstream with a main stream of oil prior to water addition and emulsification. This main stream of oil is preferably untreated crude oil, however, it may be any oil, including oil that has been treated to enhance its ability to form a stable emulsion or treated to optimize its rheology.

Examples

In a typical experiment 5 grams (g) of crude oil was added to 30 milliliters (ml) of water or brine in a conical flask with a four-way baffle at the bottom. The conical flask with the four-way baffle is a special design to allow adequate aeration in biotreatment experiments. Urea and ammonium dihydrogen phosphate were added to the flask in an amount where the C:N:P ratio was 100:10:1. This level is optimum for 48 hour biotreatment of crude oil. Lower levels can be used with appropriate increase in reaction time. Hydrophobic solid particles like divided bentonite or hydrophobic silica, e.g. Aerosil® R 972, can be added to the flask for enhanced effectiveness. If solid particles are used, the polar oxygenated products can adsorb onto the surface of the solids and render them more hydrophobic. Thus, it is preferable to add the solids prior to the bioreaction. Next, a 1 ml aliquot of an inoculum of hydrocarbon degraders, i.e. microbes, obtained from a refinery wastewater treatment plant was added to the bioreactor. The contents of the flask were shaken on an orbital shaker at 250 rpm for 48 hours at room temperature.

After 48 hours of biotreatment, the entire contents of the flask were added in 5 ml aliquots to 15 g of untreated crude oil and mixed using a Silverson® mixer at 12000 rpm to provide a solids-stabilized water-in-crude oil emulsion. The procedure described above generates an untreated/biotreated feed of 75/25. For higher ratios of untreated/biotreated feed (e.g., 90/10 or 95/5) the entire contents of the bioreactor were added to the required quantity of untreated crude oil and mixed. This step was followed by addition of more water and mixing to provide the desired emulsion.

The biotreated water-in-oil emulsions were subjected to the following tests

1. Bench stability at 25° C.
2. Optical Microscopy and NMR for determination of brine droplet size/size distribution
3. Centrifuge stability (the microcentrifuge test is described in Appendix-1)
4. Micropercolation test (Flow stability through a sand pack as described in Appendix-1)
5. Emulsion rheology using a Brookfield® viscometer (cone (#51) and plate configuration) at 60° C. in a shear range of 1.92 to 384 $sec^{-1}$.

Illustrative Examples

The invention has been demonstrated using two crude oils referred to herein as Oil #1 and Oil #2.

As indicated in Table 1, Iatroscan and HPLC-2 analyses of Oil #1 before and after biotreatment indicate that the primary change in the crude oil composition is a decrease in saturates and increase in polars due to the biotreatment. This observation is in line with expectations concerning nutrient enhanced crude oil bio-oxidation.

TABLE 1

Changes in Crude Oil Resulting from Biotreatment

Iatroscan Results

Mass % Components

| | Saturates | Aromatics | NSO's | Asphaltenes |
|---|---|---|---|---|
| Untreated Oil #1 | 39.22 | 38.26 | 14.19 | 8.34 |
| Biotreated Oil #1 | 35.99 | 38.59 | 17.08 | 8.40 |

HPLC-2 Results

Mass % Components

| | Saturates | 1 Ring | 2 Ring | 3 Ring | 4 Ring | Polars | Mass Recovery |
|---|---|---|---|---|---|---|---|
| Untreated Oil #1 | 49.10 | 7.85 | 8.24 | 5.12 | 13.17 | 16.52 | 76.27 |
| Biotreated Oil #1 | 45.97 | 8.27 | 8.88 | 5.98 | 13.45 | 17.44 | 80.23 |

Experimental data on emulsification using blends of biotreated and untreated crude oil are compiled in Table 2.

TABLE 2

Solids Stabilized 60/40 Water-in-Oil Emulsions Containing Biotreated Oil and Biotreated Water

| Oil | Solids | Wt % solids | % Biotreated Oil #1 | % Biotreated Water | Stability % bbo | Viscosity (cP) 60 C., 9.6s-1 |
|---|---|---|---|---|---|---|
| 1. Oil #1 | R 972 | 0.15 | 0 | 0 | 47 | 3644 |
| 2. Oil #1 | R 972 | 0.15 | 0 | 0[1.] | 47 | 3644 |
| 3. Oil #1 | D-Bent[2.] | 0.07 | 0 | 0 | 62 | Unstable |
| 4. Oil #1 | R 972[3.] | 0.15 | 12 | 50 | 0 | 4258 |
| 5. Oil #1 | R 972 | 0.15 | 5 | 20 | 0 | 4750 |
| 6. Oil #1 | R 972 | 0.15 | 1 | 22 | 10 | 4750 |
| 7. Oil #1 | D-Bent | 0.07 | 5 | 100 | 20 | 4258 |
| 8. Oil #2 | R 972 | 0.15 | 0 | 0 | 45 | 1474 |
| 9. Oil #2 | R 972 | 0.15 | 12 | 50 | 0 | 2457 |

[1.] Urea and ammonium dihydrogen phosphate were added to the brine in this experiment to determine the influence of nutrients only on stability
[2.] D-Bent is divided bentonite clay
[3.] R 972 is Aerosil® R 972 (product of DeGussa Corp.)

The first three entries in Table 2 are controls that indicate solids-stabilized water-in-oil emulsions made from Oil #1 with no biotreatment. These emulsions show significant brine breakout in the Berea micropercolation test. Note that Entry number 2 shows that the nutrients do not act as additives to influence emulsion stability.

Entries number 4, 5, 6 & 7 illustrate the influence of biotreatment on enhancing emulsion stability.

With 0.15 wt % Aerosil® R 972 as the solids stabilizer, addition of biotreated crude and brine imparts significant emulsion stability as evidenced by the low brine breakouts. In experiments 4, 5 & 6 the hydrophobic solids, Aerosil® R 972, were added to the oil after the bioreaction step but before the addition of brine and mixing. The viscosity of the emulsions was unchanged with repeat cycles, indicative of emulsion stability to shear. Dispersed brine droplets were less than 4 microns in diameter in these emulsions.

In the experiment relating to entry number 7, divided bentonite was added to the bioreactor and the solids were allowed to interact with the bioproducts during the biotreatment process. Improved emulsion stability is observed using divided bentonite clay as the solids stabilizer when used in conjunction with the biotreatment process, as indicated by the reduction of brine breakout from 62% without biotreatment to 20% with biotreatment.

Entry number 8 is a control emulsion made from Oil #2 and solids (with no biotreatment) showing significant brine breakout in the Berea micropercolation test.

Entry number 9 illustrates the influence of biotreatment of the crude oil on enhancing emulsion stability of Oil #2.

The present invention has been described in connection with its preferred embodiments. However, persons skilled in the art will recognize that many modifications, alterations and variations to the invention are possible without departing from the true scope of the invention. Accordingly, all such modifications, alterations and variations shall be deemed to be included in this invention as defined by the appended claims.

3. Pretreatment by Photochemical Treatment of Oil

Another pretreatment step for improving the stability of a water-in-oil emulsion comprises the step of photochemically treating at least a portion of the oil prior to emulsification. The photochemically treated oil is mixed with water to form a water-in-oil emulsion, which has enhanced stability over a water-in-oil emulsion made with untreated oil. Optionally, solid particles can be added to make a solids-stabilized water-in-oil emulsion with enhanced stability.

The photochemical treatment process comprises exposing oil to a suitable light source for a sufficient time to cause a photochemical reaction to occur in the oil. The light source can be from UV to visible radiation, and is preferably sunlight. Increasing the surface area of the oil exposed to the light source enhances the photochemical reaction. Accordingly, the oil is preferably placed such that optimum surface area is exposed to the light source. For example, for the preferred embodiment of using sunlight as the light source, it is preferred to spread the oil in a thin layer so that a large surface area of the oil is exposed to the sunlight. Moreover, the surface area of the oil exposed to the light source can be increased by periodical mixing.

The photochemical treatment of oil can be performed either with or without the presence of air or oxygen. When the process is performed in the absence of air or oxygen, radical cross-linking reactions can occur which lead to increased production of asphaltene-like compounds. These asphaltene-like compounds are surface-active and act as stabilizers at the water and oil interface, thereby promoting emulsion stability. When the process is performed in the presence of air or oxygen, these asphaltene-like compounds are also formed. But in addition to the radical cross-linking reactions that form these stabilizing compounds, oxidation reactions can also occur. The aromatic components of the oil that have benzyllic carbons and those that have fused rings that are oxidizable including, but not limited to naphthelene and anthracene, are oxidized to the corresponding acids, ketones or quinine products. Organo sulfur and nitrogen compounds present in the oil are oxidized to sulfoxides and nitrogen oxides. These oxygenated compounds are more surface-active than the aromatic components themselves and act as stabilizers at the oil and water interface, thereby providing enhanced emulsion stability. It is preferred to photochemically treat the oil in the presence of air or oxygen.

A dye sensitizer can be added to the oil to enhance the photochemical treatment process. The dye sensitizer will increase the quantum efficiency of the photochemical conversion of crude oil to oxidized and cross-linked products. Oil soluble dyes are the preferred dyes, however water soluble dyes can also be used. Non-limiting examples of dye sensitizers are Rhodamine-B, Crystal Violet and Mallicite Green. Such dye sensitizers and the techniques of using such are well known in the art, and therefore will not be discussed herein. The photo-oxidation can be conducted at elevated temperatures to enhance the reaction rate and achieve product selectivity, however, photo-oxidation between 25 to 50° C. is preferred.

Optionally, sub-micron or micron sized solid particles can be added to the oil prior to forming the emulsion, as previously discussed, which particles act to further enhance the stability of the resulting emulsion.

The solid particles useful in conjunction with photochemical pretreatment can be either hydrophilic or hydrophobic. Bentonite clays, such as those mined in Wyoming, Ga, or other numerous locations around the world, are particularly suited as stabilizers for water-in-oil emulsions. As mined, these clays naturally consist of aggregates of particles that can be dispersed in water and broken up by shearing into units having average particle sizes of 2 microns or less. However, each of these particles is a laminated unit containing approximately 100 layers of fundamental silicate layers of 1 nanometer (nm) thickness bonded together by inclusions of atoms such as calcium in the layers. By exchanging the atoms such as calcium by sodium or lithium (which are larger and have strong attractions for water molecules in fresh water), and then exposing the bentonite to fresh water, the bentonite can be broken into individual 1 nm thick layers, called fundamental particles. The chemistry of this delamination process is well known to those skilled in the art of clay chemistry. The result of this delamination process is a gel consisting of divided bentonite clay.

The solid particles can be added after the oil is photochemically treated, however, it is preferred to add the solid particles to the oil and then photochemically treat the oil-solid particle mixture. If the solid particles are present during the photochemical treatment process performed in the presence of air or oxygen, the polar oxygenated products that result from the treatment can adsorb on to the surface of the solids, thereby rendering them amphiphilic or enhancing their amphiphilic nature. Amphiphilic material has both hydrophobic and hydrophilic characteristics. The enhanced amphiphilic nature of the solid particles increases their effectiveness as stabilizers at the oil and water interface. Fumed silica, sold under the trade name Aerosil® R 972 or Aerosil® 130 (products of DeGussa Corp.), divided bentonite clays, kaolinite clays, organophilic or carbonaceous solids like coke fines or coal dust are the preferred solids.

Preferably, formation water is used to make the emulsion, however, fresh water can also be used and the ion concentration adjusted as needed to help stabilize the emulsion under formation conditions.

Preparation of a Solids-Stabilized Emulsion Using Photochemically Treated Oil

To prepare an emulsion using photochemically treated oil, the oil is photochemically treated for a sufficient time to enable the physical and chemical modifications to the oil. Preferably, the oil is irradiated by sunlight, however any other light source within the UV to visible range will suffice. The treatment may occur in the absence of air or oxygen, but it is preferred to photochemically treat the oil in the presence of air or oxygen.

If solid particles are used, the solid particles may be added before, during or after the photochemical treatment, but should be added before emulsification. The amount of solid particle added to the oil can vary in the range of about 1% to 90% based on the weight of the oil. At the higher concentrations, the mixture of solids and oil will be a high solids content slurry. The preferred treat rate for the solids is 0.05 to 2.0 wt %, based on the weight of the oil.

The preferred solid is divided or delaminated bentonite clay that is obtained as a gel from the delamination process described above. The amount of gel added to the oil before the photochemical treatment step can very in the range of 5 to 95% of gel based on the weight of the oil, preferably 40 to 60%. The weight of bentonite clay solids in the gel can very from 1 to 30% based on the weight of the water. When bentonite clay gel is used as the solid particle, and is added to the oil and subjected to the photochemical treatment step, water from the gel will evaporate from the oil/gel mixture. It is preferred to evaporate more than 50% of the water from the bentonite clay gel and oil mixture.

It is preferred to photochemically treat a slipstream or master batch of a mixture of oil and solids and subsequently mix the slipstream with a main stream of oil prior to water addition and mixing, i.e. prior to emulsification. This main stream of oil is preferably untreated crude oil, however, it may be any oil, including oil that has been treated to enhance its ability to form a stable emulsion or treated to optimize its rheology. If untreated crude oil is used as the main stream, the preferred blending rate is 0.01 to 10% of photochemically treated oil in the untreated main stream, more preferably 1 to 2%.

After the photochemical treatment step and solid particle addition (if any), water is added in small aliquots or continuously and the mixture is subjected to shear mixing at 1000 to 12000 rpm for a time sufficient to disperse the water as small droplets in the continuous oil phase. It is preferred to have a water concentration in the water-in-oil emulsion of 40 to 80%, more preferably 50 to 65%, and most preferably 60%. The temperature of the emulsion will rise above ambient temperature of 25° C. during mixing. Controlling the temperature of the emulsion during mixing is not critical. However, higher temperatures between 40 to 70° C. are preferred.

The photochemically treated oil can be further treated with dilute mineral or organic acid to provide additional stability to the water-in-oil emulsion. The preferred acid treat rate is between 8 and 30,000 ppm. If this acid pretreatment step is used, the pH of the resulting emulsion can be adjusted by adding a calculated amount of a weak base to the emulsion to obtain an emulsion in the preferred pH range of 5 to 7. However, adjusting pH is optional as in some cases it is desirable to inject an acidic emulsion and allow the reservoir formation to buffer the emulsion to the reservoir alkalinity.

Ammonium hydroxide is the preferred base for pH adjustment. Stronger bases like sodium hydroxide, potassium hydroxide and calcium oxide have a negative effect on emulsion stability. One possible explanation for this effect is that strong bases tend to invert the emulsion, i.e. convert the water-in-oil emulsion to an oil-in-water emulsion. Such an inversion is undesirable for the purposes of this invention.

In addition to increasing the stability of the water-in-oil emulsion, dilute acid treatment lowers the viscosity of the emulsion. This reduced viscosity aids in enhancing the injectivity of the emulsion, and may also be beneficial in other aspects in EOR processes, for example, matching the emulsion's rheology with that of the subterranean oil to be recovered when using the emulsion as a drive fluid. Gas may also be added to further lower the viscosity of the emulsion.

Examples

In a typical experiment, 1 gram (g) of bentonite clay gel is mixed with 0.1 g of a crude oil, Crude Oil #1, providing a gel to crude oil ratio of 1:0.1. The oily gel is then spread out as a thin layer on a petri dish and photochemically treated by placing the oil under a 200 Watt (W) tungsten lamp for 48 hours.

For a dye sensitized photochemical treatment process, 1 g of Crude Oil #1 is first mixed with 0.01 g of Rhodamine-B dye, which is a red dye that is known to increase the quantum efficiency of the photo-chemical conversion of oil to oxidized products. The dye-sensitized oil is then mixed with bentonite clay gel at a gel to crude oil ratio of 1:0.1. The oily gel is spread out as a thin layer on a petri dish and photochemically treated by placing under a 200W tungsten lamp for 48 hours.

Crude Oil #1 and dye sensitized Crude Oil #1 samples without added solid particles were also photochemically treated under the 200W tungsten lamp for 48 hours.

Results of the IATRA scan (silica gel column chromatography) analyses on untreated Crude Oil #1 and photochemically treated Crude Oil #1 are shown in Table-3. Photochemical treatment results in a decrease in the aromatic fraction and an increase in the oxidized fraction and the polar asphaltene fraction of the crude oil.

TABLE 3

Characterization of Photochemically Treated Oil #1

| Iatroscan | Saturates | Aromatics | NSO | Asphaltenes |
|---|---|---|---|---|
| Untreated Crude Oil #1 | 35.4 | 39.8 | 15.4 | 9.4 |
| Dye Sensitized Photo-chemically Treated Crude Oil #1 | 34.2 | 26.6 | 26.6 | 12.7 |
| Photochemically Treated Crude Oil #1 | 31.1 | 20.5 | 30.7 | 17.9 |
| Thermally Air Oxidized Crude Oil #1 | 34.2 | 19.3 | 33.6 | 13.0 |
| Biologically Oxidized Crude Oil #1 | 32.4 | 39.8 | 18.4 | 9.4 |

Preparation of Water-in-Crude Emulsions Using Photochemically Treated Bentonite

Solids-stabilized water-in-crude oil emulsions were prepared by first mixing the photochemically treated bentonite solids with the untreated crude oil at a treat rate of 0.12 wt % of solids to the weight of crude oil. This was followed by water addition in small aliquots to the crude oil and mixing after each addition, as described above. Mixing was accomplished using a Silverson Mixer at 12000 rpm.

The water-in-oil emulsions were subjected to the following tests
1. Bench stability at 25° C.
2. Optical Microscopy and NMR for determination of brine droplet size/size distribution
3. Flow stability through a sand pack with and without ethane addition (Micropercolation test is described in Appendix-1)
4. Centrifuge stability (described in Appendix-1)
5. Emulsion rheology using a Brookfield viscometer (cone (#51) and plate configuration) at 60° C. in a shear range of 1.92 to 384 sec$^{-1}$.

Emulsion stability results for a 60/40 Water-in-Crude Oil #1 stabilized with 0.12 wt % of photochemically treated bentonite is shown in Table-4. Addition of untreated bentonite is observed to cause destabilization of the emulsion. However when the photochemically treated bentonite is used a significant increase in stability results. Further, when ethane (400 psi) is added to the emulsion as viscosity reducing agent, retention in emulsion stability is observed.

TABLE 4

Micro-Percolation Test Results for Water-in-Crude Oil #1 Emulsions Stabilized by Photochemical Treatment

| | % Brine Break Out |
|---|---|
| Untreated Emulsion | 48% |
| Bentonite Treated Emulsion | 58% |
| Photochemical Treatment + Bentonite Treated Emulsion | 21% |
| Photochemical Treatment + Bentonite + Ethane Treated Emulsion | 18% |

Using the Pretreated Water-in-Oil Emulsion

The pretreated water-in-oil emulsion can be used in a wide range of enhanced oil recovery applications. One typical application is using such an emulsion for displacing oil from a subterranean formation, i.e. using the pretreated water-in-oil emulsion as a drive fluid. The pretreated water-in-oil emulsion is prepared and then injected into the subterranean formation, typically, but not necessarily through an injection well. The water-in-oil emulsion, which is injected under pressure, is used to displace the oil in the formation towards a well, typically a production well, for recovery.

Another application is to use the pretreated water-in-oil emulsion as a barrier fluid to divert the flow of hydrocarbons in a subterranean formation. The pretreated water-in-oil emulsion is prepared and then injected into the subterranean formation. The emulsion is used to fill "thief zones" or to serve as a horizontal barrier to prevent coning of water or gas. As previously noted, "thief zones" and coning events will reduce the efficiency of enhanced oil recovery operations.

The present invention has been described in connection with its preferred embodiments. However persons skilled in the art will recognize that many modifications, alterations, and variations to the invention are possible without departing from the true scope of the invention. Accordingly, all such modifications, alterations, and variations shall be deemed to be included in this invention, as defined by the appended claims.

Appendix-1: Micro-Percolation Test for Emulsion Stability in Flow Through Porous Media The observation that emulsions that are unstable will form two separate macroscopic phases, an oil/emulsion phase and a water phase, is relied upon in order to ascertain the stability of an emulsion on flow through porous media in a rapid, convenient assay. A volume of emulsion that passes completely through the porous media can therefore be centrifuged to form two distinct phases, whose volumes can be used as a measure of the emulsion stability—the greater the proportion of water or water originally in the emulsion, that forms a clear, distinct phase after passage and centrifugation, the more unstable the emulsion. A convenient parameter to measure stability is therefore the "brine-breakout" or "bbo", defined as the fraction of the water or brine that is in the emulsion that forms the distinct separate aqueous phase. Since it is a proportion, the bbo is dimensionless and ranges between one (maximally unstable) and zero (maximally stable). The brine breakout is measured under a well-defined set of conditions.

A commercially available special fritted micro-centrifuge tube that is comprised of two parts is used as the container for the experiment. The bottom part is a tube that catches any fluid flowing from the top tube. The top part is similar to the usual polypropylene microcentrifuge tube, except that the bottom is a frit that is small enough to hold sand grains back, but allows the easy flow of fluid. In addition, the tubes come supplied with lids to each part, one of which serves also as a support that allows the top to be easily weighed and manipulated while upright. They are available from Princeton Separations, Inc., Adelphia N.J. and are sold under the name "CENTRI-SEP COLUMNS."

A heated centrifuge is used to supply the pressure to flow the emulsion fluid through a bit of sand placed in the upper tube. It was supplied by Robinson, Inc., (Tulsa, Okla.) Model 620. The temperature is not adjustable, but stabilizes at 72° C. under our conditions. The top speed is about 2400 revolutions per minute (RPM) and the radius to the sandpack is 8 centimeters (cm), which gives a centrifugal force of 520 g. All weights are measured to the nearest milligram.

The columns come supplied with a small supply of silica gel already weighed into the tube. This is discarded, and the weights of both sections noted. About 0.2 grams (g) of sand is weighed into the top and 0.2±0.01 g of oil added to the top. Typical sands used for this experiment are Berea or Ottawa sands. The sand that is used in this test can be varied according to one's purpose. For simplicity, one may use unsieved, untreated Ottawa sand, supplied by VWR Scientific Products. This gives a convenient, "forgiving" system because the sand particles are rather large and free of clay. Alternatively, one may use one fraction that passes through 100 Tyler mesh, but is retained by a 150 mesh, and another fraction that passes through the 150 Tyler mesh, blended in a ten to one ratio respectively. The tube is weighed again, then centrifuged for one minute at full speed on the heated centrifuge. The bottom tube is discarded and the top is weighed again, which gives the amount of sand and oil remaining in the top. The sand is now in an oil wetted state, with air and oil in the pore space.

Now, 0.18±0.02 g of emulsion is placed on top of the wetted sand, and the top is weighed again. A bottom tube is weighed and placed below this tube to catch the effluent during centrifugation.

A separate bottom tube is filled with 0.2 to 0.5 g of emulsion only. This serves as a control to determine if the centrifuging of the emulsion, without it being passed through the oil-wetted sand, causes brine to break from the emulsion. This step is known as the microcentrifuge test, and is also an indicator of emulsion stability.

Both tubes are then centrifuged for a noted time (15 to 45 minutes) depending on the oil viscosity and centrifuge speed. The object in adjusting the length of time is to get to a point where at least 75% of the emulsion arrives in the bottom tube after passing through the sand. If less than that appears, the assembly is centrifuged for an additional time(s).

After spinning, the weight of the top and bottom pieces are again recorded. If the emulsion is unstable, a clear water phase will be visible in the bottom of the tube, below an opaque, black emulsion/oil phase. The volume of water in the bottom receptacle is then measured by pulling it up into a precision capillary disposable pipette (100–200 microliters) fitted with a plunger. These are supplied by Drummond Scientific Co. (under the name "Wiretroll II"). The length of the water column is measured and converted to mass of water through a suitable calibration curve for the capillary. The water breakout can be then calculated from these measurements and the knowledge of the weight fraction of water in the emulsion originally.

We claim:

1. A method for recovering hydrocarbons from a subterranean formation, said method comprising the steps of:
   a) preparing a water-in-oil emulsion by
      1) obtaining oil to be used in said emulsion,
      2) pretreating at least a portion of said oil, said pretreating step comprising at least one of adding a polymer which comprises a fuctionalized or a functionalizable polymer to said oil, biotreating said oil, photochemically treating said oil, or combinations thereof, wherein where said pretreating step includes adding a functionalizable polymer said method further includes functionalizing said functionalizable polymer.
      3) adding water, and
      4) mixing until said water-in-oil emulsion is formed;
   b) injecting said water-in-oil emulsion into said subterranean formation; and
   c) recovering hydrocarbons from said subterranean formation.

2. The method of claim 1, wherein said pretreating step comprises adding a polymer to said oil prior to emulsification.

3. The method of claim 2, wherein said polymer is selected from the group consisting of functionalized polymers, functionalizable polymers, mixtures of at least two functionalized polymers, mixtures of at least two functionalizable polymers, and mixtures of at least one functionalized polymer and at least one functionalizable polymer.

4. The method of claim 2, wherein said polymer is added at a treat rate of about 0.01 wt % to about 1 wt % based on the weight of the oil.

5. The method of claim 2, wherein said method further comprises the addition of at least one sulfonating agent to further enhance the stability of said emulsion.

6. The method of claim 5, wherein said sulfonating agent is added at a treat rate of about 0.1 wt % to about 15 wt % based on the weight of the oil.

7. The method of claim 5, wherein said sulfonating agent is sulfuric acid.

8. The method of claim 7, wherein said sulfuric acid is added to said oil at a treat rate of about 0.5 wt % to about 5.0 wt % based upon the weight of said oil.

9. The method of claim 5, further comprising the steps of determining the pH of said water-in-crude oil emulsion following emulsification and if necessary adjusting said pH so that it falls in the range of from about 5.0 to about 7.0.

10. The method of claim 9, wherein said pH of said water-in-crude oil emulsion is adjusted by adding ammonium hydroxide to said emulsion.

11. The method of claim 2, wherein said method further comprises the addition of solid particles to said oil prior to emulsification to further enhance the stability of said emulsion.

12. The method of claim 11, wherein said solid particles are added to said oil at a treat rate of about 0.01 wt % to about 10 wt % based on the weight of said oil.

13. The method of claim 11, wherein said solid particles are oleophilic solid particles.

14. The method of claim 1, wherein said pretreating step comprises biotreating said oil prior to emulsification.

15. The method of claim 14, wherein said biotreatment step comprises adding oil-degrading microbes, reactor water and nutrients to said oil.

16. The method of claim 15, wherein said reactor water is added at an oil to reactor waterratio of 1:100 to 1:10.

17. The method of claim 15, wherein said microbes are added at a rate of about 0.1 wt % to about 5 wt % of microbe inoculum to said oil based on the weight of said reactor water, wherein said inoculum has a colony forming unit of between about $10^3$ to about $10^9$.

18. The method of claim 15, wherein said nutrients comprise carbon, nitrogen and phosphorus containing nutrients.

19. The method of claim 18, wherein said nutrients comprise a carbon to nitrogen to phosphorus ratio of between about 100:10:1 to about 100:10:0.1.

20. The method of claim 14, wherein said biotreatment step occurs at temperatures of between about 20 C. to about 70 C.

21. The method of claim 14, wherein said biotreatment step occurs in the presence of an air purge.

22. The method of claim 14, wherein said method further comprises the addition of solid particles to said oil prior to emulsification to further enhance the stability of said emulsion.

23. The method of claim 22, wherein said solid particles comprise hydrophobic solid particles.

24. The method of claim 22, wherein said solid particles comprise hydrophiic solid particles.

25. The method of claim 22, wherein said solid particles are added to said oil at a treat rate of about 0.05 wt % to about 0.25 wt % based on the weight of said oil.

26. The method of claim 1, wherein said pretreating step comprises photochemically treating said oil prior to emulsification.

27. The method of claim 26, wherein said step of photochemically treating said oil comprises irradiating said oil.

28. The method of claim 27, wherein said step of irradiating said oil comprises exposing said oil to radiation in the range of ultraviolet to visible radiation.

29. The method of claim 27, wherein said step of irradiating said oil comprises exposing said oil to sunlight.

30. The method of claim 26, wherein said photochemical treatment is enhanced by the addition of a dye sensitizer.

31. The method of claim 26, wherein said method further comprises the addition of solid particles to said oil prior to emulsification to further enhance the stability of said emulsion.

32. The method of claim 31, wherein said solid particles are added to said oil before said photochemical treatment step.

33. The method of claim 31, wherein said solid particles are added to said oil after said photochemical treatment step, and before said emulsification.

34. The method of claim 31, wherein said solid particles comprise hydrophobic solid particles.

35. The method of claim 31, wherein said solid particles comprise hydrophilic solid particles.

36. The method of claim. 31, wherein said solid particles are added as a gel comprising solid particles and water.

37. The method of claim 36, wherein said solid particles comprise about 1 wt % to about 30 wt % of said gel based on the weight said water.

38. The method of claim 31, wherein said gel is added to said oil in a treat range of about 5 wt % to about 95 wt % of said gel to said oil.

39. The method of claim 36, wherein said solid particles are bentonite clay.

40. The method of claim 31, wherein said solid particles are added to said oil at a treat rate of about 0.05 wt % to about 2.0 wt % based on the weight of said oil.

41. The method of claim 1, wherein said water-in-oil emulsion is used as a drive fluid to displace hydrocarbons in said subterranean formation.

42. The method of claim 1, wherein said water-in-oil emulsion is used as a barrier fluid to divert the flow of hydrocarbons in said subterranean formation.

* * * * *